US010077674B2

(12) United States Patent
Miller et al.

(10) Patent No.: US 10,077,674 B2
(45) Date of Patent: Sep. 18, 2018

(54) TRUNNION RETENTION FOR A TURBINE ENGINE

(71) Applicant: General Electric Company, Schenectady, NY (US)

(72) Inventors: Brandon Wayne Miller, Cincinnati, OH (US); Ian Francis Prentice, Cincinnati, OH (US); Daniel Alan Niergarth, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 485 days.

(21) Appl. No.: 14/747,132

(22) Filed: Jun. 23, 2015

(65) Prior Publication Data

US 2016/0376919 A1    Dec. 29, 2016

(51) Int. Cl.
*F01D 21/04*    (2006.01)
*F01D 7/00*    (2006.01)
(Continued)

(52) U.S. Cl.
CPC ............ *F01D 21/045* (2013.01); *B64C 11/06* (2013.01); *F01D 5/3007* (2013.01); *F01D 5/3023* (2013.01); *F01D 5/3069* (2013.01); *F01D 7/00* (2013.01); *F01D 25/162* (2013.01); *F02C 3/04* (2013.01); *F04D 29/323* (2013.01); *F04D 27/0292* (2013.01); *F05D 2220/32* (2013.01); *F05D 2220/36* (2013.01); *F05D 2240/24* (2013.01); *F05D 2240/35* (2013.01); *F05D 2240/50* (2013.01); *F05D 2240/80* (2013.01); *F05D 2260/30* (2013.01); *F05D 2260/33* (2013.01); *F05D 2260/74* (2013.01);

(Continued)

(58) Field of Classification Search
CPC .... F02C 7/32; F05D 2260/74; F05D 2260/79; F05D 2260/30; F05D 2260/33; F01D 5/3023; F01D 5/3069; F01D 5/3007; F01D 7/00; F01D 21/045; B64C 11/06
See application file for complete search history.

(56) References Cited

U.S. PATENT DOCUMENTS 2,144,428 A * 1/1939 Martin .................. B64C 11/008
            416/134 R
2,499,837 A * 3/1950 Sheets ..................... B64C 11/06
            29/898.061

(Continued)

FOREIGN PATENT DOCUMENTS

EP    2535519 A2    12/2012

OTHER PUBLICATIONS

European Search Report and Opinion issued in connection with corresponding EP Application No. 16175693.7 on Oct. 24, 2016.

*Primary Examiner* — Andrew Nguyen
(74) *Attorney, Agent, or Firm* — General Electric Company; Pamela Kachur (57) ABSTRACT

A fan for a gas turbine engine is provided. The fan includes a plurality of fan blades, a disk, and a trunnion mechanism for attaching the fan blades to the disk. The disk can be formed of a plurality of individual disk segments, with the trunnion mechanism attaching one of the plurality of fan blades to a respective disk segment. A retention member is also provided. The retention member includes a means for catching a portion of the trunnion mechanism should a primary attachment system of the trunnion mechanism fail.

16 Claims, 9 Drawing Sheets

(51) Int. Cl.
    *B64C 11/06*     (2006.01)
    *F01D 5/30*     (2006.01)
    *F01D 25/16*     (2006.01)
    *F02C 3/04*     (2006.01)
    *F04D 29/32*     (2006.01)
    *F04D 27/02*     (2006.01)

(52) U.S. Cl.
    CPC ......... *F05D 2260/79* (2013.01); *Y02T 50/672* (2013.01); *Y02T 50/673* (2013.01)

(56) References Cited

U.S. PATENT DOCUMENTS

| | | | |
|---|---|---|---|
| 4,585,390 A | 4/1986 | Pirtle et al. | |
| 4,738,590 A | 4/1988 | Butler | |
| 5,015,150 A | 5/1991 | Rohra | |
| 5,129,786 A | 7/1992 | Gustafson | |
| 5,263,898 A | 11/1993 | Elston, III et al. | |
| 5,282,720 A | 2/1994 | Szpunar | |
| 5,374,145 A | 12/1994 | Mairesse et al. | |
| 6,884,028 B2 | 4/2005 | Brauer et al. | |
| 2008/0247877 A1* | 10/2008 | Gallet | F01D 7/00 416/156 |
| 2009/0005306 A1 | 2/2009 | Oka | |
| 2009/0053065 A1 | 2/2009 | Oka | |
| 2010/0239421 A1* | 9/2010 | Boston | B64C 11/06 416/136 |
| 2013/0003945 A1 | 1/2013 | Caldwell et al. | |
| 2013/0094943 A1* | 4/2013 | Bouru | B64C 11/06 415/170.1 |
| 2013/0034389 A1 | 12/2013 | MacKie et al. | |
| 2013/0343896 A1 | 12/2013 | Mackie et al. | |
| 2014/0003945 A1 | 1/2014 | Perdrigeon et al. | |

\* cited by examiner

TRUNNION RETENTION FOR A TURBINE ENGINE

FIELD OF THE INVENTION

The present subject matter relates generally to a fan for a gas turbine engine, or more particularly to redundant fan blade retention features for a fan for a gas turbine engine.

BACKGROUND OF THE INVENTION

A gas turbine engine generally includes a fan and a core arranged in flow communication with one another. The core of the gas turbine engine general includes, in serial flow order, a compressor section, a combustion section, a turbine section, and an exhaust section. In operation, an airflow is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the combustion section drives the combustion section and is then routed through the exhaust section, e.g., to atmosphere. In particular configurations, the turbine section is mechanically coupled to the compressor section by a shaft extending along an axial direction of the gas turbine engine.

The fan includes a plurality of blades having a radius larger than the core of the gas turbine engine. The fan and the plurality of blades are typically driven by the shaft. Each blade in the plurality of blades can be attached to a trunnion mechanism, the trunnion mechanism in turn attached to a disk. The trunnion mechanism is rotatable relative to the disk to allow for varying a pitch of the plurality of blades. Accordingly, the trunnion mechanism may be attached to the disk using various bearings and other accompanying structure.

To increase a safety of the gas turbine engine, components downstream of the fan are designed with the possibility in mind that the attachment system attaching the trunnion to the disk may fail. However, such a configuration can decrease an efficiency of the gas turbine engine. For example, an increased weight of armor added to a fuselage of the gas turbine engine can reduce an efficiency of the gas turbine engine.

Accordingly, a fan for a gas turbine engine having one or more features to catch the trunnion and the blade attached thereto in the event of a failure of an attachment system attaching the trunnion to the disk would be beneficial. Further, a fan for a gas turbine engine having one more redundant attachment features for catching the trunnion and the blade that does not interfere with the operation or assembly of the fan would be particularly useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a fan for a gas turbine engine is provided. The fan includes a fan blade and a trunnion mechanism including a trunnion and a primary attachment system. The fan blade is attached to the trunnion. The fan also includes a disk having a generally annular shape and including a disk segment. The disk segment has a collar. The trunnion extends at least partially through the disk segment and is attached to the disk segment using the primary attachment system. The fan also includes a retention member attached to the collar of the disk segment and including a means for catching the trunnion should the primary attachment system fail.

In another exemplary embodiment of the present disclosure, a fan for a gas turbine engine is provided. The fan includes a fan blade and a trunnion mechanism. The trunnion mechanism includes a trunnion and a primary attachment system. The trunnion includes a platform for attachment to the fan blade, the platform having an outer surface. The fan also includes a disk having a generally annular shape and including a disk segment. The trunnion extends at least partially through the disk segment and is attached to the disk segment using the primary attachment system. The fan also includes a retention ring having a generally annular shape and including a retention member defining an auxiliary support channel with the outer surface of the platform of the respective trunnion. The fan also includes at least one retention feature positioned in the auxiliary support channel.

In still another exemplary embodiment of the present disclosure, a gas turbine engine is provided. The gas turbine engine includes a core engine and a variable pitch fan in mechanical communication with the core engine. The fan includes a fan blade and a trunnion mechanism having a trunnion and a primary attachment system. The fan blade is attached to the trunnion. The fan also includes a disk having a generally annular shape and including a disk segment. The disk segment includes a collar and the trunnion extends at least partially through the disk segment and is attached to the disk segment using the primary attachment system. The fan also includes a retention member attached to the collar of the disk segment and including a means for catching the trunnion should the primary attachment system fail.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "upstream" and "downstream" refer to the relative direction with respect to fluid flow in a fluid pathway. For example, "upstream" refers to the direction from which the fluid flows, and "downstream" refers to the direction to which the fluid flows.

Figure 1:
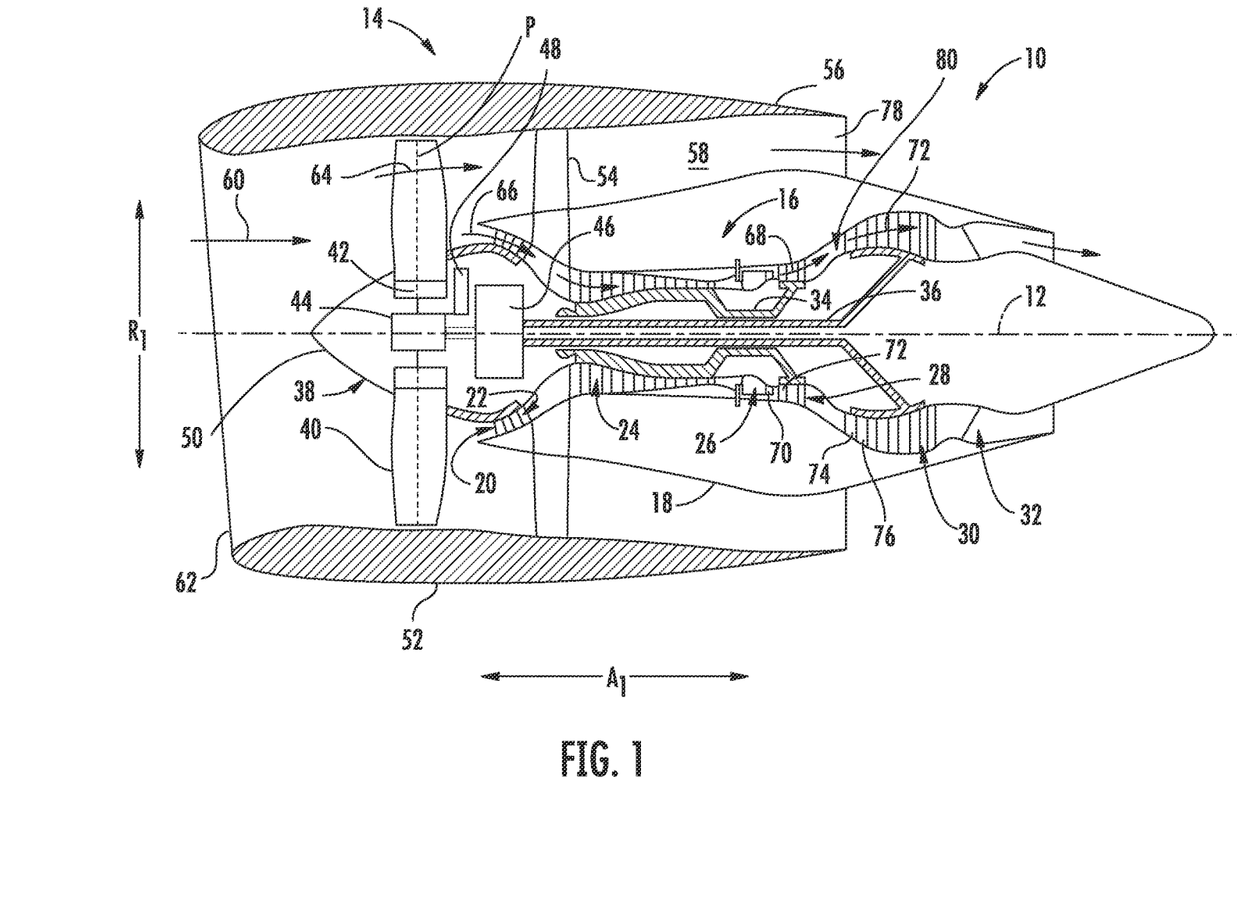
FIG. 1 is a schematic cross-sectional view of a gas turbine engine according to an exemplary embodiment of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine, referred to herein as "turbofan engine 10." It should be appreciated, however, that the turbofan engine 10 depicted in FIG. 1 and described below is by way of example only, and that embodiments of the present disclosure may be incorporated in other gas turbine engines as well (such as an un-ducted turbofan engines).

As shown in FIG. 1, the exemplary turbofan engine 10 defines an axial direction $A_1$ (extending parallel to a longitudinal centerline 12 provided for reference) and a radial direction $R_1$. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

Additionally, for the embodiment depicted, the fan section 14 includes a variable pitch fan 38 having a plurality of fan blades 40 coupled to a disk 42 in a spaced apart manner. The disk 42 may have a generally annular shape about the axial direction $A_1$, as will be discussed below. The fan blades 40 extend outwardly from disk 42 generally along the radial direction $R_1$. Each fan blade 40 is also rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan 38 speed.

Further, the fan blades 40 are operatively coupled to a pitch correction device 48 (e.g., a counterweight device, or a suitable pitch lock device) across the actuation member 44 such that the pitch correction device 48 is said to be remote from (i.e., not coupled directly to) the plurality of fan blades 40. The counterweight device 48 may have any suitable configuration enabling the counterweight device 48 to function as described herein (e.g., to not be coupled directly to the fan blades 40). However, in other exemplary embodiments, any other suitable pitch correction/counterweight device 48 may be used.

Referring still to the exemplary turbofan engine 10 of FIG. 1, including the variable pitch fan 38, the disk 42 of the variable pitch fan 38 is covered by a rotatable front hub 50 aerodynamically contoured to promote an airflow through the plurality of fan blades 40. The exemplary fan section 14 additionally includes an annular fan casing or outer nacelle 52 that circumferentially surrounds the fan 38 and/or at least a portion of the core turbine engine 16. It should be appreciated that the nacelle 52 may be configured to be supported relative to the core turbine engine 16 by a plurality of circumferentially-spaced outlet guide vanes 54. Moreover, a downstream section 56 of the nacelle 52 may extend over an outer portion of the core turbine engine 16 so as to define a bypass airflow passage 58 therebetween.

During operation of the turbofan engine 10, a volume of air 60 enters the turbofan 10 through an associated inlet 62 of the nacelle 52 and/or fan section 14. As the volume of air 60 passes across the fan blades 40, a first portion of the air as indicated by arrows 64 is directed or routed into the bypass airflow passage 58 and a second portion of the air as indicated by arrow 66 is directed or routed into the LP compressor 22. The ratio between the first portion of air 64 and the second portion of air 66 is commonly known as a bypass ratio. The pressure of the second portion of air 66 is then increased as it is routed through the high pressure (HP) compressor 24 and into the combustion section 26, where it is mixed with fuel and burned to provide combustion gases 68.

The combustion gases 68 are routed through the HP turbine 28 where a portion of thermal and/or kinetic energy from the combustion gases 68 is extracted via sequential stages of HP turbine stator vanes 70 that are coupled to the outer casing 18 and HP turbine rotor blades 72 that are coupled to the HP shaft or spool 34, thus causing the HP shaft or spool 34 to rotate, thereby supporting operation of the HP compressor 24. The combustion gases 68 are then routed through the LP turbine 30 where a second portion of thermal and kinetic energy is extracted from the combustion gases 68 via sequential stages of LP turbine stator vanes 74 that are coupled to the outer casing 18 and LP turbine rotor blades 72 that are coupled to the LP shaft or spool 36, thus causing the LP shaft or spool 36 to rotate, thereby supporting operation of the LP compressor 22 and/or rotation of the fan 38.

The combustion gases 68 are subsequently routed through the jet exhaust nozzle section 32 of the core turbine engine 16 to provide propulsive thrust. Simultaneously, the pressure of the first portion of air 64 is substantially increased as the first portion of air 64 is routed through the bypass airflow passage 58 before it is exhausted from a fan nozzle exhaust section 78 of the turbofan 10 also providing propulsive thrust. The HP turbine 28, the LP turbine 30, and the jet exhaust nozzle section 32 at least partially define a hot gas path 80 for routing the combustion gases 68 through the core turbine engine 16.

Figure 2:
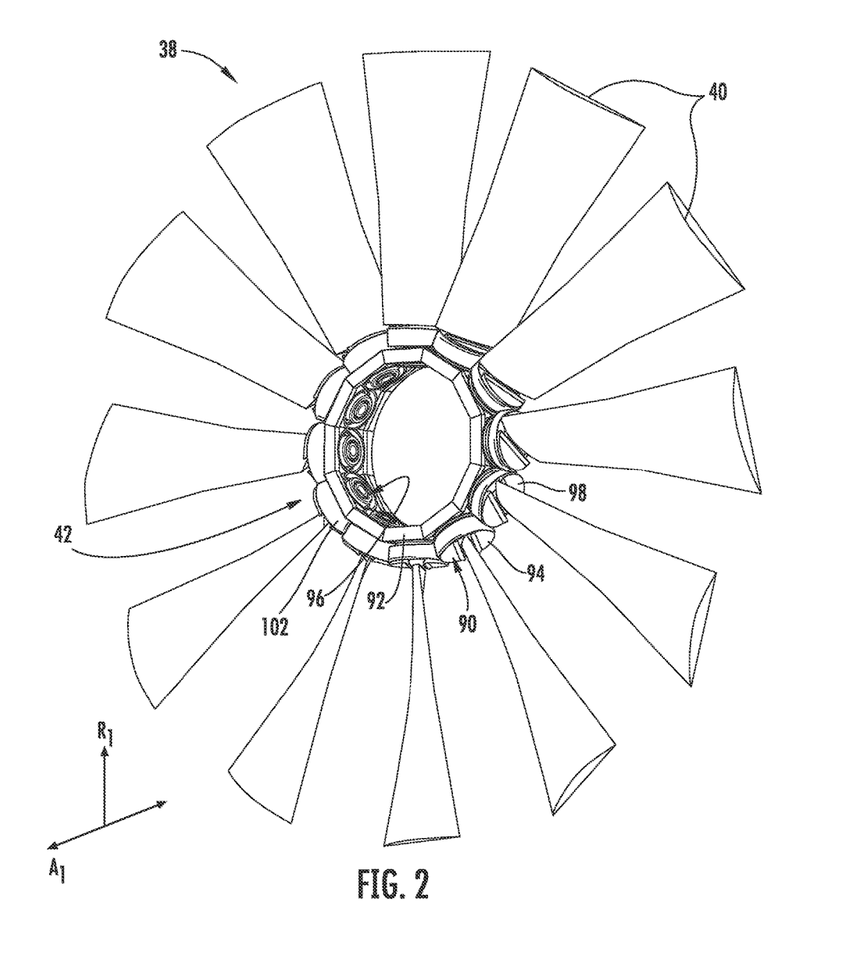
FIG. 2 is perspective view of a variable pitch fan of the exemplary gas turbine engine of FIG. 1 in accordance with an exemplary embodiment of the present disclosure.

Referring now to FIG. 2, the fan 38 will be described in greater detail. FIG. 2 provides a perspective view of the fan 38 of the exemplary turbofan engine 10 of FIG. 1. For the exemplary embodiment depicted, the fan 38 includes twelve (12) fan blades 40. However, in other embodiments, the fan 38 may have any suitable blade count. For example, in other suitable embodiments, the fan 38 may have at least eight (8) fan blades 40, at least twelve (12) fan blades 40, or at least eighteen (18) fan blades 40. Each fan blade 40 is attached to the disk 42 using a trunnion mechanism 90. More particularly, the disk 42 includes a plurality of disk segments 92 that are rigidly coupled together or integrally molded together in a generally annular shape (e.g., a polygonal shape). Each fan blade 40 is coupled to a respective disk segment 92 using a respective trunnion mechanism 90. For the embodiment depicted, each trunnion mechanism 90 includes a trunnion 94 and a primary attachment system 96. Further, each trunnion 94 includes a platform 98 for attachment to a respective one of the fan blades 40 and a shaft 100 (see FIGS. 3, 6) that extends at least partially through a respective one of the disk segments 92. As will be discussed in greater detail below with reference to FIGS. 5 and 6, the trunnion 94 is attached to the disk segment 92 using the primary attachment system 96.

The trunnion mechanisms 90 facilitate retaining its associated fan blade 40 on the disk 42, or disk segment 92, during operation of the fan 38 and rotation of disk 42. More specifically, each trunnion mechanism 90 facilitates providing a load path from a respective fan blade 40 to a respective disk segment 92 for the centrifugal load generated by the fan blades 40 during rotation about engine centerline axis 12. Further, the trunnion mechanism 90, or rather its primary attachment system 96, facilitates a rotation of a respective fan blade 40 relative to disk 42 about a pitch axis P.

Figure 3:
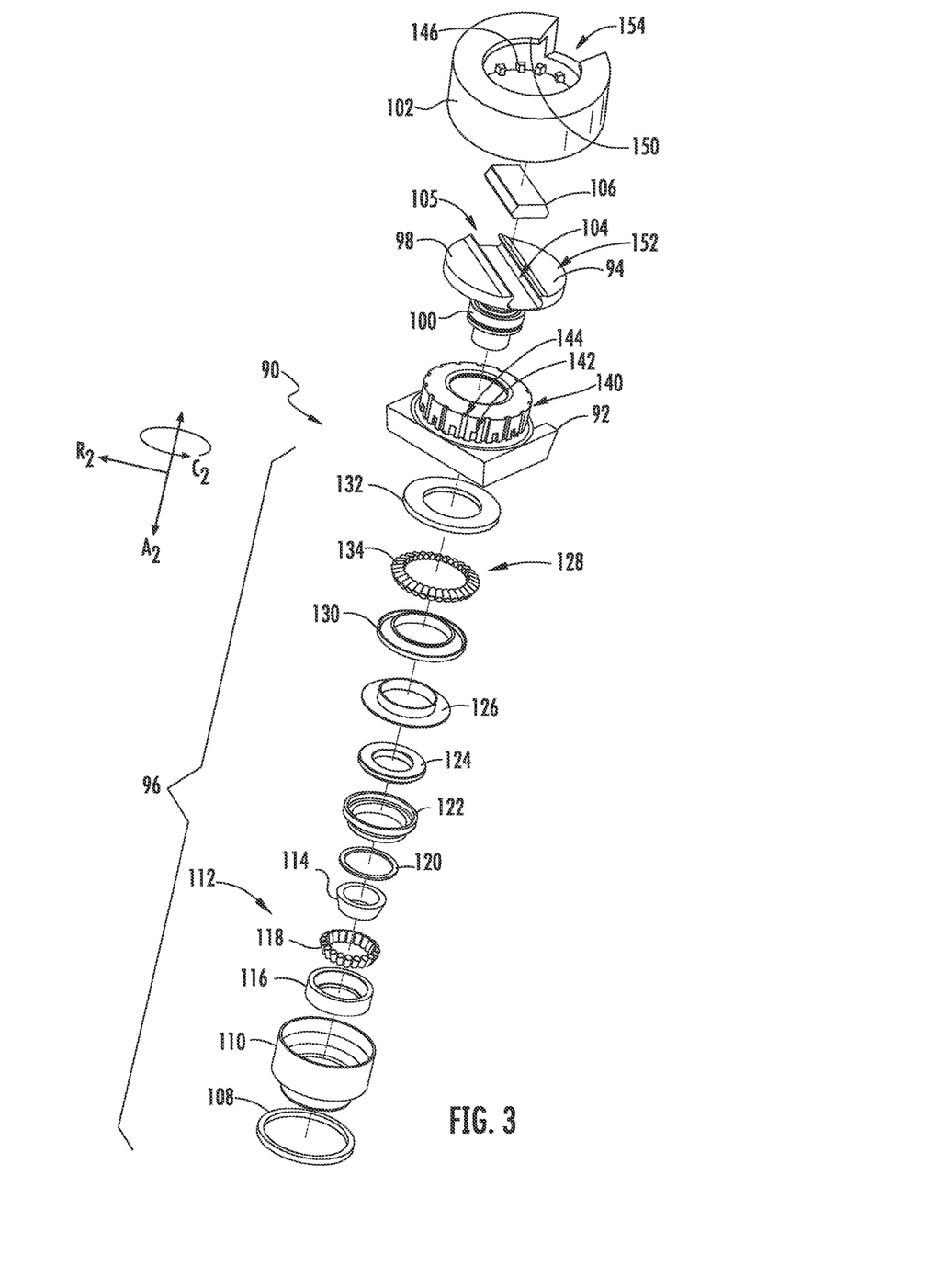
FIG. 3 is an exploded perspective view of a disk segment, a trunnion mechanism, and a retention member in accordance with an exemplary embodiment of the present disclosure.

Referring now to FIG. 3, an individual disk segment 92 and trunnion mechanism 90 are depicted along with a retention member 102 in accordance with an exemplary embodiment of the present disclosure. More particularly, FIG. 3 provides an exploded perspective view of an exemplary disk segment 92 and trunnion mechanism 90, along with a retention member 102 in accordance with an exemplary embodiment of the present disclosure.

Each trunnion mechanism 90 generally defines an axial direction $A_2$, a radial direction $R_2$, and a circumferential direction $C_2$. The axial direction $A_2$ of the trunnion mechanism 90 may be substantially parallel to the pitch axis P discussed above, and thus may be substantially parallel to the radial direction $R_1$ defined by the exemplary turbofan engine 10 of FIG. 1. Additionally, as stated, the trunnion mechanism 90 generally includes the trunnion 94 and the primary attachment system 96, the trunnion 94 generally including the platform 98 and the shaft 100. The platform 98 of the trunnion 94 defines an axial dovetail slot 104 extending generally along the radial direction $R_2$ of the trunnion mechanism 90 for receipt of a dovetail 106. The dovetail 106 is depicted as an individual component for clarity, however in practice, the dovetail 106 may be a built-in, integral portion of a fan blade 40 (i.e., a root of the fan blade 40). More particularly, for the embodiment depicted, the slot 104 defines an outer end 105 along the radial direction $R_2$ of the trunnion mechanism 90 such that the dovetail 106 may slide into the slot 104 defined in the platform 98. It should be appreciated, however, that in other exemplary embodiments, the fan blade 40 may be attached to the disk 42, or the disk segment 92, in any other suitable manner. For example, in other exemplary embodiments, the trunnion mechanism 90 may include a spar-type trunnion, wherein the shaft of the trunnion essentially extends into and forms a frame of the fan blade 40. With such an exemplary embodiment, the shaft of the trunnion may be formed integrally with at least a portion of the fan blade 40. Additionally, or alternatively, the trunnion mechanism 90 may include a trunnion capable of receiving a pinned root of a fan blade 40. With such an embodiment, a pin may be extended through an opening in the trunnion 94 that aligns with an opening in a root of the fan blade 40.

Referring still to the embodiment of FIG. 3, the primary attachment system 96 generally includes: a coupling nut 108; a lower bearing support 110; a first line contact bearing 112 (having, for example, an inner race 114, an outer race 116, and a plurality of rollers 118); a snap ring 120; a key hoop retainer 122; a segmented key 124; a bearing support 126; and a second line contact bearing 128 (having, for example, an inner race 130, an outer race 132, and a plurality of rollers 134). As may also be seen in FIG. 6, discussed in greater detail below, in the exemplary embodiment depicted, the first line contact bearing 112 is oriented at a different angle than the second line contact bearing 128 (as measured from a centerline axis of rollers 118 relative to the axial direction $A_2$, and from a centerline axis of rollers 134 relative to the axial direction $A_2$). More specifically, line contact bearings 112, 128 are preloaded against one another in a face-to-face (or duplex) arrangement, wherein the centerline axes are oriented substantially perpendicular to one another. It should be appreciated, however, that in other exemplary embodiments, the line contact bearings 112, 128 may instead be arranged in tandem so as to be oriented substantially parallel to one another.

Additionally, for use as bearings 112, 128, at least the following types of line contacting type rolling element bearings are contemplated: cylindrical roller bearings; cylindrical roller thrust bearings; tapered roller bearings; spherical roller bearings; spherical roller thrust bearings; needle roller bearings; and tapered roller needle bearings. When assembled, coupling nut 108 is threadably engaged with disk segment 92 so as to sandwich the remaining components of trunnion mechanism 90, or rather the primary attachment system 96, between coupling nut 108 and disk segment 92, thereby retaining trunnion mechanism 90 attached to disk segment 92. It should be appreciated, however, that in other exemplary embodiments, the primary attachment system 96 of trunnion mechanism 90 may additionally or alternatively include any other suitable type of bearing. For example, in other exemplary embodiments, the trunnion mechanism 90 may include roller ball bearings or any other suitable bearing. Further, in still other exemplary embodiments, any other suitable primary attachment system 96 may be provided for attaching the trunnion 94 to the disk segment 92.

Figure 4:
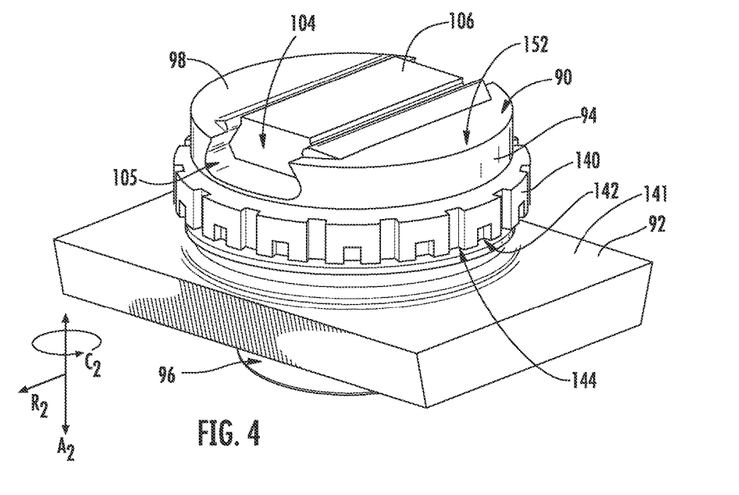
FIG. 4 is a perspective view of the exemplary disk segment and trunnion mechanism of FIG. 3.
Figure 5:
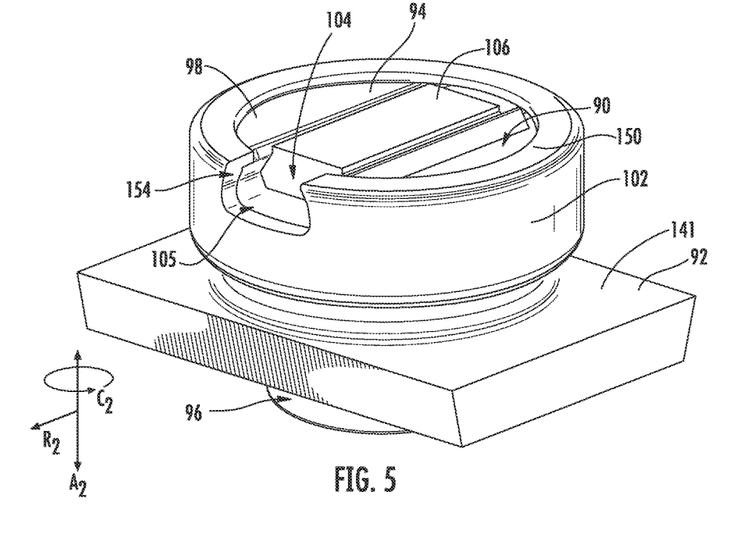
FIG. 5 is a perspective view of the exemplary disk segment and trunnion mechanism of FIG. 3, along with the exemplary retention member of FIG. 3 installed.
Figure 6:
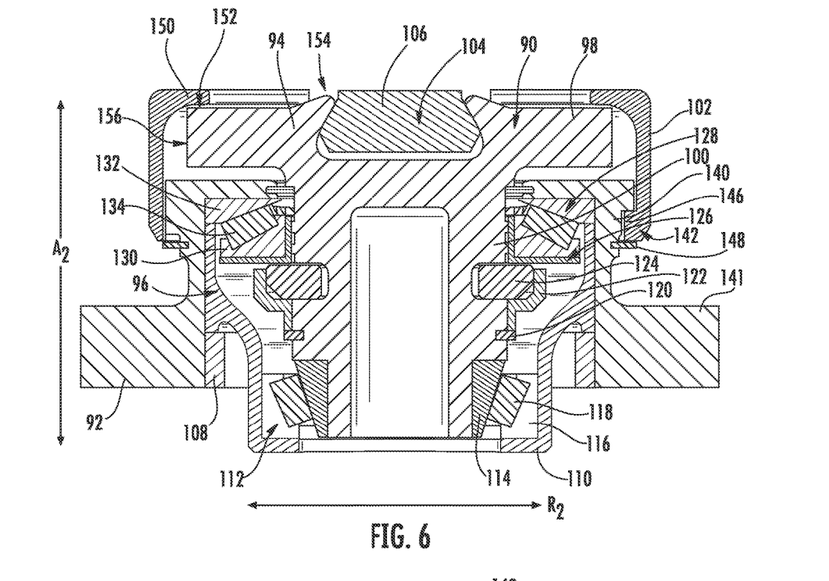
FIG. 6 is a side, cross-sectional view of the exemplary disk segment and trunnion mechanism of FIG. 3, along with the exemplary retention member of FIG. 3 installed.

Referring now also to FIGS. 4 through 6, the fan 38 may also include a retention member 102 attached to a collar 140 of the disk segment 92 (see FIGS. 5 and 6). FIG. 4 provides a perspective view of the exemplary disk segment 92 and trunnion mechanism 90; FIG. 5 provides a perspective view of the exemplary disk segment 92 and trunnion mechanism 90, along with a retention member 102 in accordance with an exemplary embodiment of the present disclosure installed; and FIG. 6 provides a side, cross-sectional view of the exemplary disk segment 92, trunnion mechanism 90, and retention member 102.

The retention member 102 is configured to attach to the collar 140 of the disk segment 92, the collar 140 extending generally along the axial direction $A_2$ away from a body 141 of the disk segment 92. More particularly, for the embodiment depicted, the collar 140 of the disk segment 92 includes a plurality of attachment slots 142 extending generally along the axial direction $A_2$ of the trunnion mechanism 90 and inwardly along the radial direction $R_2$ of the trunnion mechanism 90. Additionally, the collar 140 of the disk segment 92 defines a plurality of loading slots 144 also extending generally along the axial direction $A_2$ of the trunnion mechanism 90 and inwardly along the radial direction $R_2$ of the trunnion mechanism 90. The loading slots 144 extend substantially along an entire length of the collar 140 of the disk segment 92 along the axial direction $A_2$, whereas the attachment slots 142 extend less than the entire length of the collar 140 of the disk segment 92 along the axial direction $A_2$. Further, the loading slots 144 and attachment slots 142 are spaced around the collar 140 generally along the circumferential direction C.

As may be seen in, e.g., FIG. 3, the exemplary retention member 102 includes a plurality of teeth 146 extending inwardly along the radial direction $R_2$ of the trunnion mechanism 90. Each of the teeth 146 have a geometry complementary to the attachment slots 142 and the loading slots 144, such that each of the teeth 146 may slide generally along the axial direction $A_2$ through the loading slots 144 and into the attachment slots 142. Accordingly, the retention member 102 may be attached to the collar 140 of the disk segment 92 by moving the retention member 102 axially and circumferentially relative to the collar 140 of the disk segment 92. More particularly, the retention member 102 may be attached to the collar 140 of the disk segment 92 in the following manner: First, the teeth 146 of the retention member 102 may be aligned with the loading slots 144 of the collar 140 of the disk segment 92. The retention member 102 may then be moved along the axial direction $A_2$ such that the teeth 146 of the retention member 102 slide through the loading slots 144 of the collar 140 of the disk segment 92. The retention member 102 may then be rotated about the circumferential direction $C_2$ such that the teeth 146 are then aligned with the attachment slots 142 in the collar 140 of the disk segment 92. Then the retention member 102 may then be moved in an opposite direction along the axial direction $A_2$ such that the teeth 146 are positioned at least partially within the attachment slots 142. Once in position, a locking member 148 may be positioned around at least a portion of an outside surface of the collar 140 of the disk segment 92 to hold the retention member 102 in position (see FIG. 6).

Figure 7:
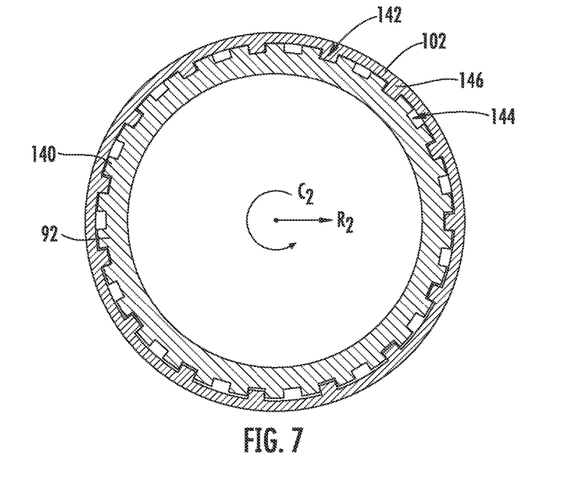
FIG. 7 is a top, cross-sectional view of an attachment portion of the exemplary disk segment of FIG. 3 and exemplary retention member of FIG. 3.

Referring now briefly to FIG. 7, providing a top, cross-sectional view of the collar 140 of the disk segment 92 and the retention member 102, when the retention member 102 is installed, each of the plurality of teeth 146 are positioned in a respective one of the plurality of attachment slots 142 to attach the retention member 102 to the collar 140 of the disk segment 92. It should be appreciated, however, that in other exemplary embodiments, the retention member 102 may be attached to the collar 140 of the disk segment 92 in any other suitable manner. For example, in certain exemplary embodiments, each loading slot 144 and adjacent attachment slot 142 may be connected to form a generally "J-shaped" slot. Additionally, or alternatively, the retention member 102 may be rotatably engaged with the collar 140 of the disk segment 92. For example, the retention member 102 and collar 140 of the disk segment 92 may each define corresponding threaded portions.

The retention member 102 depicted in FIGS. 3 through 6 also includes a means for catching the trunnion 94 should the primary attachment system 96 fail or should the trunnion shaft 100 fail. Accordingly, the retention member 102 depicted in FIGS. 3 through 6 is configured as a redundant attachment feature for attaching the trunnion 94 of the trunnion mechanism 90 to the disk 42, or more particularly, to the collar 140 of the disk segment 92.

For the exemplary embodiment of FIGS. 3 through 6, the means for catching the trunnion 94 included with the retention member 102 is a lip 150 extending inwardly along the radial direction $R_2$ over the platform 98 of the trunnion 94. More particularly, the platform 98 of the trunnion 94 defines an outer edge 152 along the radial direction $R_2$. The lip 150 of the retention member 102 extends around the outer edge 152 of the platform 98 of the trunnion 94 and inwardly over the outer edge 152 of the platform 98 of the trunnion 94 along the radial direction $R_2$. For the embodiment depicted, the lip 150 is a single, continuous lip 150 extending entirely around the outer edge 152 of the platform 98 of the trunnion 94, with the exception of an opening 154 defined by the retention member 102 (discussed below with reference to FIG. 5). However, in other exemplary embodiments, the lip 150 may have any other suitable configuration. For example, in other exemplary embodiments, the lip 150 may instead be a plurality of individual lips 150 extending around the outer edge 152 of the platform 98 of the trunnion 94 and inwardly over the outer edge 152 of the platform 98 of the trunnion 94 along the radial direction $R_2$.

For the embodiment depicted, the lip 150 of the retention member 102 does not contact the platform 98 of the trunnion 94 member when the primary attachment system 96 is operating properly. Accordingly, the retention member 102 does not substantially support the trunnion 94 of the trunnion mechanism 90 unless the primary attachment system 96 or the trunnion shaft 100 fails. For example, should one or more components of the primary attachment system 96 or the trunnion shaft 100 fail during operation of the fan 38, the trunnion 94 and attached fan blade 40 will move outwardly from the disk segment 92 along the axial direction $A_2$ of the trunnion mechanism 90 (due at least in part to the centrifugal force on the fan blade 40). The lip 150 of the retention member 102 will then contact the outer edge 152 of the platform 98 of the trunnion 94, catching the trunnion 94 and preventing the trunnion 94 from further movement away from the collar 140 of the disk segment 92. It should be appreciated that as used herein, "does not substantially support the trunnion 94" refers to supporting less than ten percent of any forces on the trunnion 94 during normal operation of the fan 38 (e.g., prior to any failure of the primary attachment system 96 or the trunnion shaft 100).

Notably, the exemplary retention member 102 depicted may not interfere with normal operation or assembly of the fan 38. For example, the retention member 102 depicted includes features allowing for the fan blade 40 to be attached to the platform 98 of the trunnion 94 subsequent to installation of the retention member 102. More particularly, the retention member 102 is asymmetric about the axial direction $A_2$ of the trunnion mechanism 90. For example, the retention member 102 depicted extends less than three hundred and sixty degrees around the platform 98 of the trunnion 94 about the axial direction $A_2$ of the trunnion mechanism 90. Thus, the retention member 102 defines an opening 154 over the outer end 105 of the slot 104 defined in the platform 98 of the trunnion mechanism 90. The dovetail 106 depicted in FIGS. 3 through 6, which may in certain exemplary embodiments be a root of the fan blade 40, may be installed in the slot 104 defined in the platform 98 of the trunnion 94 through the opening 154 in the retention member 102 subsequent to the retention member 102 having been installed.

It should be appreciated, however, that the exemplary means for catching the trunnion 94 included with the retention member 102 described above with reference to FIGS. 3 through 6, is by way of example only. For example, referring now to FIGS. 8 through 10, another exemplary means for catching the trunnion 94 included with a retention member 102 is provided.

Figure 8:
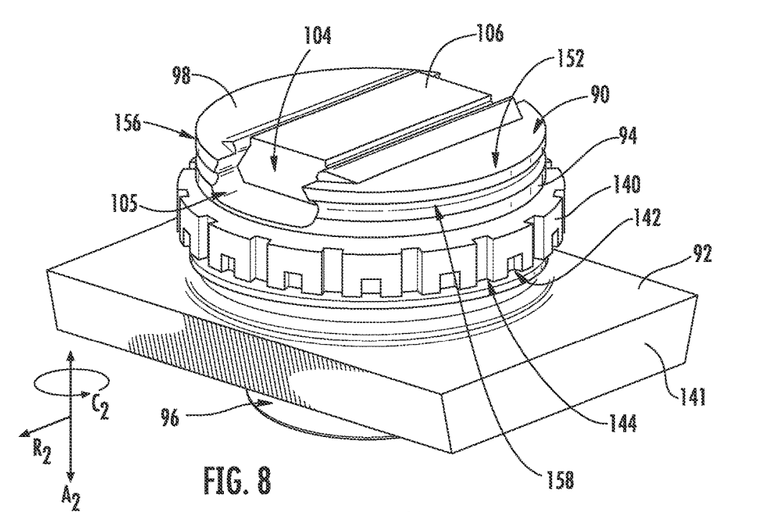
FIG. 8 is a perspective view of a disk segment and trunnion mechanism in accordance with another exemplary embodiment of the present disclosure.
Figure 9:
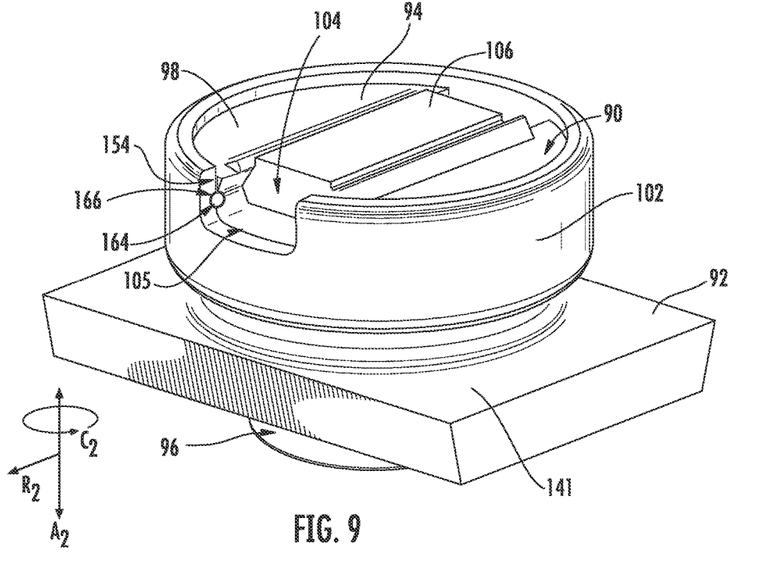
FIG. 9 is a perspective view of the exemplary disk segment and trunnion mechanism of FIG. 8, with a retention member in accordance with another exemplary embodiment of the present disclosure installed.
Figure 10:
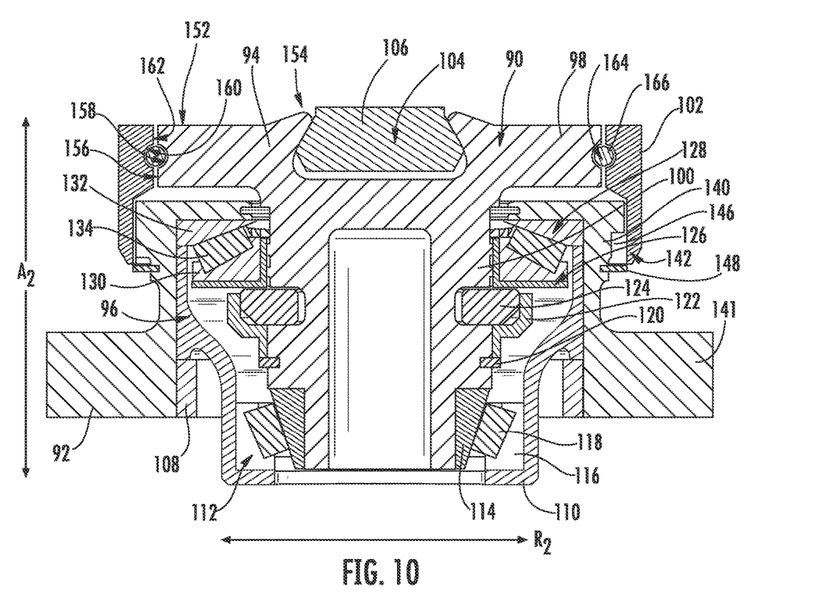
FIG. 10 is a side, cross-sectional view of the exemplary disk segment and trunnion mechanism of FIG. 8, along with the exemplary retention member of FIG. 9 installed.

The exemplary trunnion mechanism 90, disk segment 92, and retention member 102 depicted in FIGS. 8 through 10 may be configured in substantially the same manner as the exemplary trunnion mechanism 90, disk segment 92, and retention member 102 depicted in FIGS. 3 through 6 and discussed above. Accordingly, the same or similar numbering may refer to the same or similar components. For example, the exemplary retention member 102 depicted is asymmetric about an axial direction $A_2$ of the trunnion mechanism 90, defining an opening 154 allowing for the installation of a dovetail 106, such as a root of a fan blade 40. Additionally, for the embodiment depicted, the exemplary retention member 102 is attached to the collar 140 of the disk segment 92 by positioning a plurality of teeth 146 of the retention member 102 in a plurality of attachment slots 142 defined in the collar 140 of the disk segment 92. Further, the exemplary trunnion 94 is attached to the disk segment 92 using a primary attachment system 96.

However, for the exemplary embodiment depicted in FIGS. 8 through 10, the platform 98 of the trunnion 94 includes an outer surface 156 along the radial direction $R_2$ of the trunnion mechanism 90. The outer surface 156 of the platform 98 of the trunnion 94 defines a first recess 158 extending generally along the circumferential direction $C_2$ of the trunnion mechanism 90 and inwardly along the radial direction $R_2$ of the trunnion mechanism 90. Additionally, for the embodiment depicted, the means for catching the trunnion 94 included with the retention member 102 is a second recess 160 defined by an inner surface 162 of the retention member 102 and at least one retention feature positioned at least partially in the first recess 158 and at least partially in the second recess 160. The second recess 160 extends complementary to the first recess 158. More particularly, the second recess 160 defined by the inner surface 162 of the retention member 102 extends generally along the circumferential direction $C_2$ of the trunnion mechanism 90 and outwardly along the radial direction $R_2$ of the trunnion mechanism 90. As may be seen most clearly in, e.g., FIG. 10, the first recess 158 defined in the outer surface 156 of the platform 98 and the second recess 160 defined in the inner surface 162 of the retention member 102 are adjacent to one another along the radial direction $R_2$ and aligned with one another along the axial direction $A_2$. The first recess 158 and a second recess 160 together define an auxiliary support channel 164.

Moreover, for the embodiment depicted, the at least one retention feature includes a plurality of ball bearings 166. The plurality of ball bearings 166 positioned within the auxiliary support channel 164 may be connected by a membrane, such as a suitable elastomeric or plastic membrane or cage, to, e.g., assist in the installation of the ball bearings 166 into the auxiliary support channel 164 and ensure the ball bearings 166 remain in a desired position within the auxiliary support channel 164. The plurality of ball bearings 166 may be positioned within the auxiliary support channel 164 subsequent to installing the retention member 102. More particularly, once the retention member 102 has been attached to the collar 140 of the disk segment 92, the plurality of ball bearings 166 may be inserted through the opening 154 defined by the retention member 102 and into the auxiliary support channel 164. A cap or other similar feature (not shown) may be positioned in the auxiliary support channel 164 adjacent to the opening 154 to ensure the plurality of ball bearings 166 remain positioned within the auxiliary support channel 164 during operation of the fan 38.

The ball bearings 166 may define a diameter along the radial direction $R_2$ that is substantially equal to a width of the auxiliary support channel 164 along the radial direction $R_2$. It should be appreciated, that as used herein, terms of approximation, such as "about" or "substantially," refer to being within a ten percent margin of error. As with the exemplary embodiment described above with reference to FIGS. 3 through 6, the exemplary means for catching the trunnion 94 included with the retention member 102 is configured such that the retention member 102 does not substantially support the trunnion 94 unless the primary attachment system 96 of the trunnion mechanism 90 or the shaft 100 of the trunnion 94 fails.

It should be appreciated, however, that in other exemplary embodiments, any other suitable retention feature may be positioned in the auxiliary support channel 164 defined by the retention member 102 and the platform 98 of the trunnion 94. For example, in other exemplary embodiments, the retention feature may be a semi-rigid, cylindrical member positioned in the auxiliary support channel 164. Additionally, the retention feature may be formed of a metallic material or a non-metallic material, such as ceramic or non-metallic composite material. The ceramic or non-metallic composite materials may be desirable is certain embodiments due to certain mechanical properties, such as a reduced weight as compared to steel. Further, although for the embodiment depicted the auxiliary support channel 164 defines a circular cross-sectional shape, in other exemplary embodiments, the auxiliary support channel 164 may additionally or alternatively define a non-circular cross-sectional shape, such as a squared shape or other polygonal shape.

Furthermore, it should be appreciated that in other exemplary embodiments, other means for catching the trunnion 94 included with the retention member 102 may be provided. For example, in other exemplary embodiments, the outer surface 156 of the platform 98 may define a first recess that extends in a substantially linear direction, such as substantially perpendicular to the radial direction $R_2$ (as opposed to circumferentially around the outer surface 156). With such an embodiment, the means for catching the trunnion 94 included with the retention member 102 may be a second recess defined through at least a portion of the retention member and a substantially cylindrical pin positioned at least partially in the first recess and the second recess. More particularly, with such an embodiment, the first recess may define a substantially cylindrical groove with the second recess and the pin may be positioned within the groove.

Additionally, or alternatively, in still other exemplary embodiments, the means for catching the trunnion 94 included with the retention member 102 may be a combination of one or more of the embodiment described above. For example, the means for catching the trunnion 94 included with the retention member 102 may be a combination of the embodiment described above with reference to FIGS. 3 through 6 and the embodiment described above with reference to FIGS. 8 through 10. For example, the retention member 102 may include a lip 150 and may also include one or more retention features positioned in an auxiliary support channel 164 defined with the platform 98 of the trunnion 94.

Figure 11:
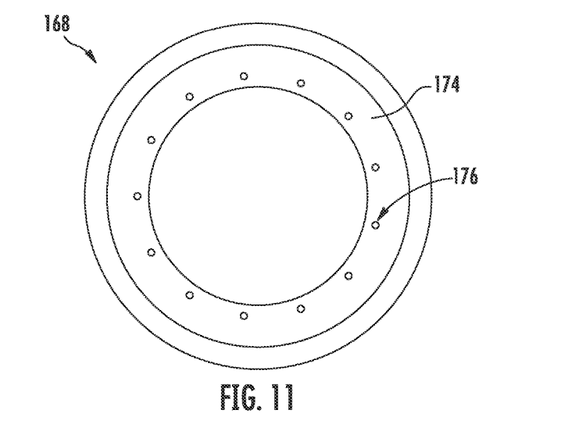
FIG. 11 is a front view of a retention ring in accordance with an exemplary embodiment of the present disclosure.
Figure 12:
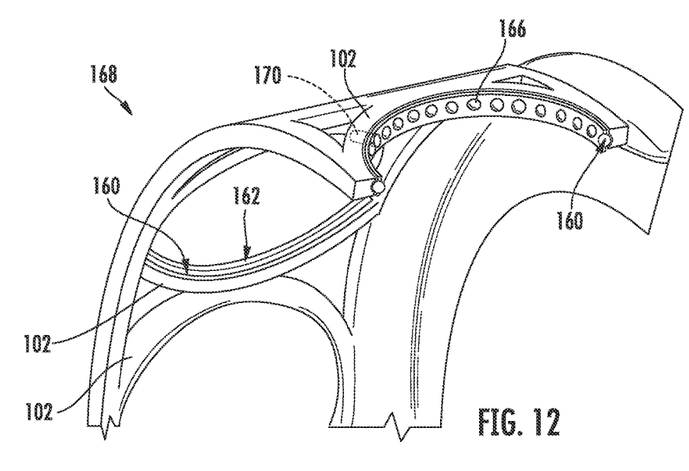
FIG. 12 is a perspective, cross-sectional view of the exemplary retention ring of FIG. 11.
Figure 13:
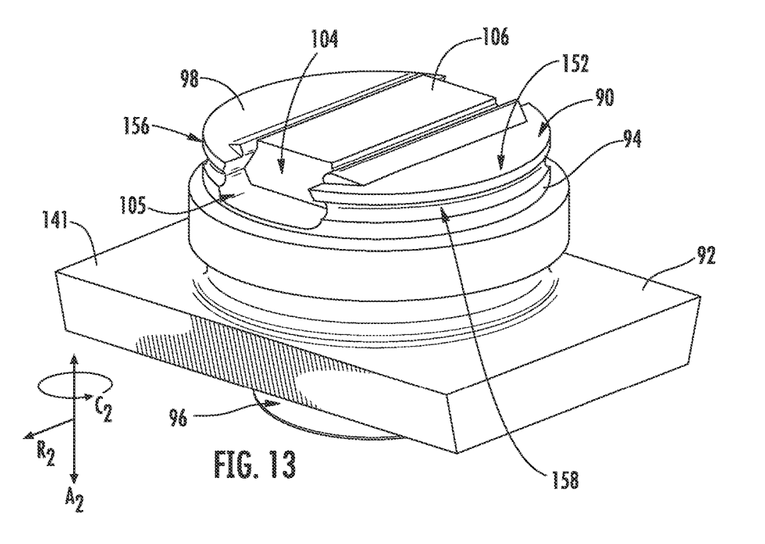
FIG. 13 is a perspective view of a disk segment and trunnion mechanism in accordance with yet another exemplary embodiment of the present disclosure.
Figure 14:
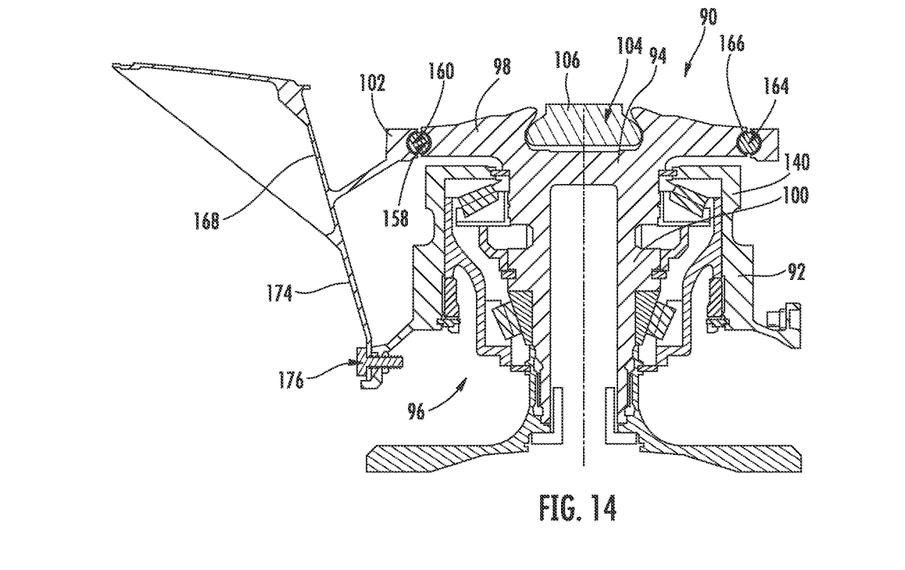
FIG. 14 is a side, cross-sectional view of the exemplary disk segment and trunnion mechanism of FIG. 13, along with the exemplary retention ring of FIGS. 11 and 12 installed.

Reference will now be made generally to FIGS. 11 through 14, depicting a retention member 102, or more particularly, a retention ring 168 including a plurality of retention members 102, in accordance with another exemplary embodiment of the present disclosure. FIG. 11 provides a front view of the exemplary retention ring 168; FIG. 12 provides a perspective cross-sectional view of the exemplary retention ring 168; FIG. 13 provides a perspective view of a trunnion mechanism 90 and disk segment 92 in accordance with an exemplary embodiment of the present disclosure; and FIG. 14 provides a side, cross-sectional view of the exemplary trunnion mechanism 90 and disk segment 92 of FIG. 13, along with the exemplary retention ring 168 depicted in FIGS. 11 and 12 installed.

The exemplary trunnion mechanism 90 and disk segment 92 depicted in FIGS. 13 and 14 may be configured in substantially the same manner as the exemplary trunnion mechanism 90, disk segment 92, and retention member 102 depicted in FIGS. 8 through 10 and discussed above. Accordingly, the same or similar numbering may refer to the same or similar components. For example, the exemplary trunnion mechanism 90 generally includes a trunnion 94 and a primary attachment system 96, the primary attachment system 96 attaching the trunnion 94 to the disk segment 92. Additionally, the trunnion 94 of the exemplary trunnion mechanism 90 depicted includes a platform 98 defining a slot 104 extending generally along the radial direction $R_2$ of the trunnion mechanism 90 for attachment to the dovetail 106, which may be in certain exemplary embodiments a root of a fan blade, such as fan blade 40.

However, for the embodiment depicted, the exemplary retention member 102 is configured as part of a retention ring 168 having a plurality of retention members 102. The exemplary retention ring 168 depicted has a shape complementary to the disk 42. More particularly, as shown in FIG. 11, the retention ring 168 has a generally annular shape, e.g., about an axial direction $A_1$ of the turbofan engine 10 (see FIG. 1). Additionally, as may be seen in FIG. 14, each of the retention members 102 of the retention ring 168 are positioned outward of the respective disk segment 92, e.g., along the radial direction $R_1$ of the turbofan engine 10 (FIG. 1), or along the axial direction $A_2$ of the trunnion mechanism 90.

Each of the retention members 102 of the retention ring 168 are configured to catch a respective trunnion 94 of the trunnion mechanism 90 should the primary attachment system 96 of such trunnion mechanism 90 or the shaft 100 of the trunnion 94 fail. More particularly, for the embodiment depicted, each retention member 102 defines an auxiliary support channel 164 with an outer surface 156 of the platform 98 of the respective trunnion 94. More particularly, the outer surface 156 of the platform 98 of the trunnion 94 defines a first recess 158 and an inner surface 162 of the retention member 102 defines a second recess 160. The first recess 158 and the second recess 160 together define the auxiliary support channel 164. Furthermore, at least one retention feature is positioned in the auxiliary support channel 164 defined between the retention member 102 of the retention ring 168 and the platform 98 of the respective trunnion 94. In certain exemplary embodiments, the at least one retention feature and auxiliary support channel 164 may be configured in substantially the same manner as the at least one retention feature and auxiliary support channel 164 described above with reference to FIGS. 8 through 10. For example, in the embodiment depicted, the at least one retention feature is configured as a plurality of ball bearings 166 connected by a membrane, such as a plastic or elastomeric membrane. However, in other embodiments, the at least one retention feature and auxiliary support channel 164 may alternatively have any other suitable configuration.

For the exemplary embodiment depicted, each retention member 102 of the retention ring 168 is formed integrally as a single unit, i.e., not bolted or otherwise removably connected. Further, for the embodiment depicted, the whole of the retention ring 168 is formed integrally as a single unit, i.e., not bolted or otherwise removably connected. For example, the retention ring 168, including each of the retention members 102, may be formed integrally as a single unit by casting, milling, etc. With such a configuration, the retention ring 168 may be formed such that there are no seams or juncture lines defined therein. Alternatively, one or more of the portions of the retention ring 168 may be formed integrally by welding. The above configurations may make for a more durable and stronger retention ring 168.

A retention ring 168 in accordance with the present disclosure may be installed before or after the trunnion 94 of the trunnion mechanism 90 is attached to the disk segment 92. For example, a retention ring 168 in accordance with the present disclosure may be completely installed from a forward side of the disk 42. Such a configuration may allow the retention ring 168 to be installed after the disk 42 is installed, or may allow the retention ring to be installed or repaired without removal of the disk 42. More particularly, in certain embodiments, the retention ring 168 may first be positioned around the disk 42, such that each retention member 102 is positioned outward of a respective disk segment 92. The trunnion 94 of each trunnion mechanism 90 may then be attached to a respective disk segment 92 using a respective primary attachment system 96. A root of a respective fan blade 40 (e.g., the dovetail 106) may then be positioned in the slot 104 of the platform 98 of the respective trunnion 94. Notably, as the one or more retention features have not been positioned in the auxiliary support channels 164 at this point, each respective retention member 102 may be moved along the axial direction $A_2$ of the respective trunnion mechanism 90 to expose the slot 104 in the platform 98 of the trunnion 94 and allow the dovetail 106 to be inserted.

Figure 15:
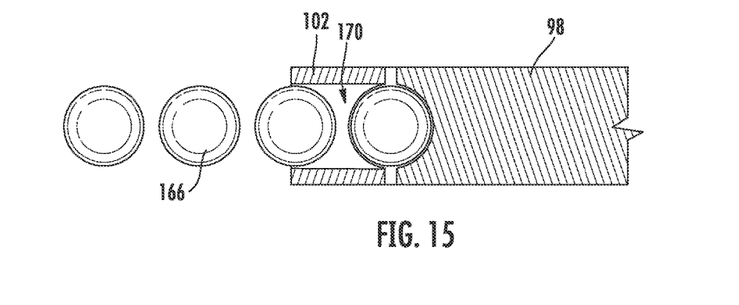
FIG. 15 is a schematic, cross-sectional view of a loading slot of the exemplary retention ring of FIGS. 11 and 12.

Once the dovetail 106 has been inserted, the one or more retention features may be installed in the auxiliary support channel 164. Referring now briefly also to FIG. 15, each retention member 102 includes a loading slot 170 for inserting the at least one retention feature into the exemplary support channel. For example, the loading slot 170 may extend from the first recess 158 in the inner surface 162 of the retention member 102, outwardly along the radial direction $R_2$ of the trunnion mechanism 90 to an outside surface 172 of the respective retention member 102 of the retention ring 168. A cap or other similar structure (not shown) may be positioned in the loading slot 170 after the one or more retention features have been installed.

Additionally, before or after the one or more retention features are installed in the respective auxiliary support channels 164, the retention ring 168 may be attached to the disk 42. For example, the exemplary retention ring 168 depicted includes a support arm 174 extending generally along the axial direction $A_2$ of the trunnion mechanism 90 (see FIG. 14) for attachment to the disk 42, particularly to each disk segment 92. For example, the exemplary support arm 174 of the retention ring 168 depicted includes a plurality of openings 176 for receiving a bolt or other mechanical attachment mechanism attaching the support arm 174 to the disk segments 92. In certain embodiments, the retention ring 168 may include at least one opening 176 per disk segment 92 of the disk 42.

It should be appreciated, however, that in other exemplary embodiments, the retention ring 168 may not be directly attached to the disk 42. For example, in other exemplary embodiments, the plurality of retention members 102 may be configured to support an individual retention member 102 (and trunnion 94 with a fan blade 40 attached thereto) in the event of a failure of a respective primary attachment system 96.

A retention ring in accordance with the present disclosure may catch a trunnion of a trunnion mechanism in the event of a failure of the primary attachment system of the trunnion mechanism. Moreover, a retention ring in accordance with the present disclosure may additionally catch a trunnion of a trunnion mechanism in the event of a failure of a portion of a disk segment of a disk of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fan for a gas turbine engine, the fan comprising:
   a fan blade;
   a trunnion mechanism defining an axial direction and comprising a trunnion and a primary attachment system, the trunnion including a platform and a shaft formed together, the fan blade attached to the platform of the trunnion;
   a disk having a generally annular shape and comprising a disk segment, the disk segment having a collar, the trunnion extending at least partially through the disk segment and attached to the disk segment using the primary attachment system; and
   a retention member attached to and at least partially surrounding the collar of the disk segment and including a means for catching the trunnion should the primary attachment system fail, the retention member extending from the collar past the platform of the trunnion along the axial direction of the trunnion mechanism and the platform positioned between the retention member and the collar along the axial direction of the trunnion mechanism.

2. The fan of claim 1, wherein the retention member extends less than three hundred and sixty degrees around the platform of the trunnion about the axial direction.

3. The fan of claim 1, wherein the trunnion mechanism defines a radial direction, wherein the platform of the trunnion defines a slot extending generally along the radial direction for receipt of a root of the fan blade, wherein the slot defines a outer end along the radial direction, and wherein the retention member defines an opening over the outer end of the slot.

4. The fan of claim 1, wherein the trunnion mechanism defines a radial direction, wherein the platform of the trunnion defines an outer edge along the radial direction, and wherein the means for catching the trunnion included with the retention member is a lip extending around the outer edge of the platform of the trunnion and inwardly of the outer edge of the platform of the trunnion along the radial direction.

5. The fan of claim 4, wherein the lip does not contact the platform of the trunnion member when the primary attachment system is operating properly.

6. The fan of claim 1, wherein the collar of the disk segment defines an outer surface, wherein the trunnion mechanism defines a radial direction, wherein the collar of the disk segment includes a plurality of attachment slots in the outer surface extending along the axial direction and inwardly along the radial direction, and wherein the retention member includes a plurality of teeth also extending inwardly along the radial direction, and wherein each of the plurality of teeth are positioned in a respective one of the plurality of attachment slots to attach the retention member to the collar of the disk segment.

7. The fan of claim 6, further comprising a locking member positioned around at least a portion of the outer surface of the collar of the disk segment for holding the retention member in position, the locking member located adjacent to the plurality of attachment slots along the axial direction.

8. The fan of claim 1, wherein the retention member does not substantially support the trunnion unless the primary attachment system fails.

9. A gas turbine engine comprising:
   a core engine; and
   a variable pitch fan in mechanical communication with the core engine, the fan including:
   a fan blade;
   a trunnion mechanism defining an axial direction and comprising a trunnion and a primary attachment system, the trunnion including a platform and a shaft formed together, the fan blade attached to the trunnion;
   a disk having a generally annular shape and comprising a disk segment, the disk segment having a collar, the trunnion extending at least partially through the disk segment and attached to the disk segment using the primary attachment system; and
   a retention member attached to and at least partially surrounding the collar of the disk segment and including a means for catching the trunnion should the primary attachment system fail, the retention member extending from the collar past the platform of the trunnion along the axial direction of the trunnion mechanism and the platform positioned between the retention member and the collar along the axial direction of the trunnion mechanism.

10. The gas turbine engine of claim 9, wherein the trunnion mechanism defines a radial direction, wherein the platform of the trunnion defines an outer edge along the radial direction, and wherein the means for catching the trunnion included with the retention member is a lip extending around the outer edge of the platform of the trunnion and inwardly of the outer edge of the platform of the trunnion along the radial direction.

11. The fan of claim 1, wherein the collar of the disk segment defines an outer surface, and wherein the retention member is coupled to the outer surface of the disk segment.

12. The fan of claim 6, wherein the plurality of attachment slots are spaced generally along a circumferential direction of the trunnion mechanism.

13. The fan of claim 6, wherein the collar of the disk segment further includes a plurality of loading slots extending generally along the axial direction of the trunnion mechanism and inwardly along a radial direction of the trunnion mechanism, wherein the loading slots extend substantially along an entire length of the collar of the disk segment along the axial direction, and wherein the attachment slots extend less than the entire length of the collar of the disk segment along the axial direction.

14. The fan of claim 1, wherein the platform defines a substantially circular shape.

15. The fan of claim 1, wherein the trunnion mechanism defines a radial direction, wherein the platform of the trunnion defines an outer edge along the radial direction, and wherein the means for catching the trunnion included with the retention member is a lip extending around the outer edge of the platform of the trunnion and inwardly of the outer edge of the platform of the trunnion along the radial direction, wherein the lip defines a gap with the outer edge of the platform along the axial direction of the trunnion mechanism.

16. The fan of claim 1, wherein the primary attachment system is positioned between the shaft of the trunnion of the trunnion mechanism and the collar of the disk segment, wherein the shaft of the trunnion extends completely through the collar of the disk segment, and wherein the platform is positioned outside the collar of the disk segment.

* * * * *